Patented Aug. 27, 1929.

1,726,018

UNITED STATES PATENT OFFICE.

MERCER G. FARRAR, OF SCARSDALE, NEW YORK, ASSIGNOR TO CARBIDE & CARBON CHEMICALS CORP., A CORPORATION OF NEW YORK.

COMPRESSED GAS.

No Drawing.    Application filed May 1, 1928.  Serial No. 274,358.

My invention relates to compressed gases and to means of preventing the freezing or congealing of condensates in discharge pipes, regulators or other appliances during use. The term "compressed gas" as used herein refers to gas which is compressed in containers and exists therein either as a gas or as a liquid. The invention is particularly applicable to compressed fuel gases, for example those which contain propane and other volatile hydrocarbons as major constituents.

Such compressed gases are discharged from the containers or cylinders either as a liquid or as a gas and the material is conducted away at reduced pressures. Water and other deleterious materials which have the property of passing out with the discharged gas and of condensing on surfaces in contact with the gas, will sometimes collect in the discharge pipe leading from the container when the gas is being drawn off. When such pipes are subjected to temperatures at or below the freezing point of the condensate, ice or congealed condensate will collect and hinder the regular discharge of gas. The gas is usually passed through a regulator or pressure reducing valve to maintain the desired working pressure of the gas. An accumulation of congealed condensate in such devices is harmful as it stops the proper functioning of the regulator and often stops the flow of gas. The drop in temperature resulting from the expansion of gas in the regulator or reducing valve cools the pipes nearby and accelerates the freezing in the pipe leading to the regulator. The accumulation of congealed condensate may occur while the gas is being used and such condensates are formed when there is only a fraction of a percent of the condensible material present. Water is the most common cause of this trouble and it has been found extremely difficult to exclude water in harmful amounts or to avoid an adventitious occurrence of moisture or other condensate in such commercially prepared containers.

It is amount the objects of my invention to provide means for preventing the stoppage in gas discharge pipes by the freezing or congealing of condensates which may be carried into the discharge pipes regulators and other appliances along with the discharged material as it is used.

I have discovered that the trouble may be avoided by introducing into the container substances, usually liquids, which are less volatile than the liquefied gas but which like water, are carried along with the gases and condense with water or other condensible material therein and form a solution with and lower the freezing point of such condensates. The amount of volatile liquid to be introduced into the container may be varied within broad limits as desired, depending upon the character of the gas or of the condensate in the container, the particular volatile liquid used, the amount of deleterious condensible constituent present in the container and the conditions of use. The amount of such condensible material may be determined by experiment and the necessary amount of volatile liquid or any desired excess thereof may then be added.

I prefer to use a small amount of methyl or ethyl alcohol for this purpose on account of the lower cost of such alcohols and because they are combustible and not harmful to most gases, but other volatile liquids which form solutions with the condensible constituents present and which lower the freezing point of the condensible constituents, may be used. Such liquids are not limited to the lower molecular weight alcohols such as methyl alcohol. Higher molecular weight alcohols such as isopropanol, volatile liquids such as acetone and mixtures of these liquids condense with water or other condensible material which may be present, and act in the same manner as methyl alcohol.

The following example is illustrative of my invention.

A cylinder containing thirty-six pounds of commercially prepared compressed and liquefied gas consisting principally of propane at a pressure of approximately twenty-seven pounds per square inch, had an initial temperature of approximately −17.8° C. (0° F.). This liquefied gas contained a fraction of a percent of water and was a material which is generally considered commercially dry. The gas evaporated from this liquid was discharged through an outlet pipe, and through a reducing or expansion valve which reduced the ultimate discharge pressure to 4 ounces per square inch. Upon discharging the gas, a condensate collected and froze in the discharge pipe and in the orifice of the reducing valve and stopped the flow of gas in about five minutes.

Two ounces of methyl alcohol having a purity of approximately 95% were introduced into the liquefied gas remaining in the cylinder and the freezing or congealing of moisture again stopped the flow of gas in about five minutes operation.

Another two ounces of the alcohol were introduced into the cylinder and the discharge of vaporized gas was continued to exhaustion of the cylinder without further difficulty. After the last addition, the liquefied gas contained approximately 1% of alcohol. This amount of alcohol satisfactorily prevented the stoppage of the discharge pipe and the expansion valve, but in practice I may add an excess of alcohol under similar conditions as the alcohol does not materially affect other properties of this gas, for its intended purpose.

The presence of the added volatile substance, such as alcohol need not be more than that required to form a non-freezing mixture with the condensate at the discharge temperature of the gas. However, a considerable variation in the amount of the added substance is permissible. About 1% of the weight of the contents of the container is usualy the amount of alcohol that is necessary to prevent the freezing of the condensate in commercially prepared gases but I prefer to add an excess. Methyl and ethyl alcohol are about equally effective.

In the usual method of packaging acetylene, the gas is dissolved in acetone. A larger amount of gas at a given pressure can be stored in this way than can be stored at the same pressure without the solvent. The gas comes out of solution when the pressure is relieved and practically all of the acetone remains in the cylinder. The amount of acetone used for such purposes is large as compared to the dissolved gas and it acts as a dehydrating agent for the gas and holds the water. The present invention relates to gases which are packaged without a solvent, in which case the addition of acetone, alcohol and the like would not be useful except for the purpose which has been described, a minor proportion being sufficient for this purpose.

Other volatile liquids which lower the freezing point of the condensate are effective and may be used to advantage in the same manner as methyl alcohol is used. Therefore I do not wish to limit my invention to the particular ingredients or to the specific proportions thereof which have been mentioned. The addition of other substances or volatile liquids to compressed gases for the purposes described is within the scope of my invention and I do not intend to limit my invention except by the prior art and by the invention as defined in the annexed claims.

I claim as my invention:

1. The method of preventing the formation of congealed condensate in the exit pipe of a holder containing compressed gas which comprises introducing into the holder a minor proportion of a volatile substance freely soluble in water.

2. The method of preventing the formation of congealed condensate in the exit pipe of a holder containing compressed gas which comprises introducing into the holder a minor proportion of an alcohol which will be expelled with the gas and which is freely soluble in water.

3. The method of preventing the formation of congealed condensate in the exit pipe of a holder containing compressed gas which comprises introducing into the holder a minor proportion of methyl alcohol.

4. The method of preventing the formation of congealed condensate in the exit pipe of a holder containing compressed hydrocarbon gas which comprises introducing in said gas a minor quantity of a volatile substance freely soluble in water.

5. The method of preventing the formation of congealed condensate in the exit pipe of a holder containing compressed hydrocarbon gas which comprises introducing in said gas a quantity of a volatile substance freely soluble in water.

6. The method of preventing the formation of congealed condensate in the exit pipe of a holder containing compressed hydrocarbon gas which comprises introducing in said gas a quantity of an alcohol freely soluble in water.

7. A pressure vessel provided with a valve, and a composition therein adapted to expel itself substantially completely on opening said valve, said composition containing a minor proportion of a volatile substance freely soluble in water.

8. A pressure vessel provided with a valve, and a composition therein adapted to expel itself substantially completely on opening said valve, said composition containing a minor proportion of a volatile organic substance freely soluble in water.

9. A pressure vessel provided with a valve, and a composition therein adapted to expel itself substantially completely on opening said valve, said composition containing a minor proportion of an alcohol which will be expelled with the gas and which is freely soluble in water.

10. A pressure vessel provided with a valve, and a composition therein adapted to expel itself substantially completely on opening said valve, said composition containing a minor proportion of methyl alcohol.

11. A pressure vessel provided with a valve, and a composition therein adapted to expel itself substantially completely on opening said valve, said composition containing about 1% of methyl alcohol.

12. A pressure vessel provided with a valve, and a compressed gas therein adapted to expel itself substantially completely on opening said valve, said composition containing a minor proportion of a volatile hydrocarbon freely soluble in water.

13. A pressure vessel provided with a valve, and a compressed gas therein containing propane and a quantity of a volatile substance freely soluble in water.

14. A pressure vessel provided with a valve and a compressed gas therein containing propane and a quantity of an alcohol freely soluble in water.

15. A pressure vessel provided with a valve, a compressed gas therein consisting mainly of propane and a volatile constituent comprising an alcohol freely soluble in water.

16. A pressure vessel provided with a valve, a compressed gas therein consisting mainly of propane and a volatile constituent consisting mainly of an alcohol freely soluble in water.

17. A pressure vessel provided with a valve, and a composition therein consisting mainly of propane adapted to expel itself substantially completely upon opening the valve, said composition containing a minor proportion of a volatile organic substance freely soluble in water.

18. A pressure vessel provided with a valve, and a composition therein consisting mainly of propane adapted to expel itself substantially completely upon opening the valve, said composition containing a minor proportion of an alcohol.

19. A pressure vessel provided with a valve, and a composition therein consisting mainly of propane adapted to expel itself substantially completely upon opening the valve, said composition containing a minor proportion of methyl alcohol.

In testimony whereof, I affix my signature.

MERCER G. FARRAR.